April 19, 1955    K. UNHOLTZ    2,706,400
VIBRATION GENERATING SYSTEM AND BEAM RESONATOR THEREFOR
Filed July 6, 1950    4 Sheets-Sheet 1
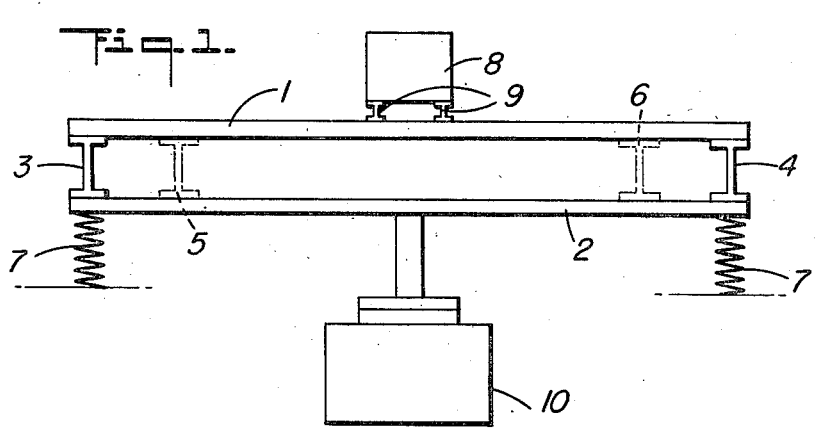
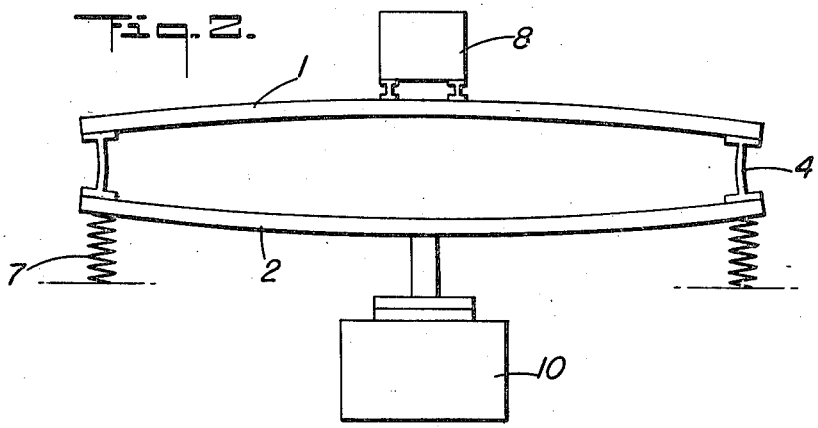
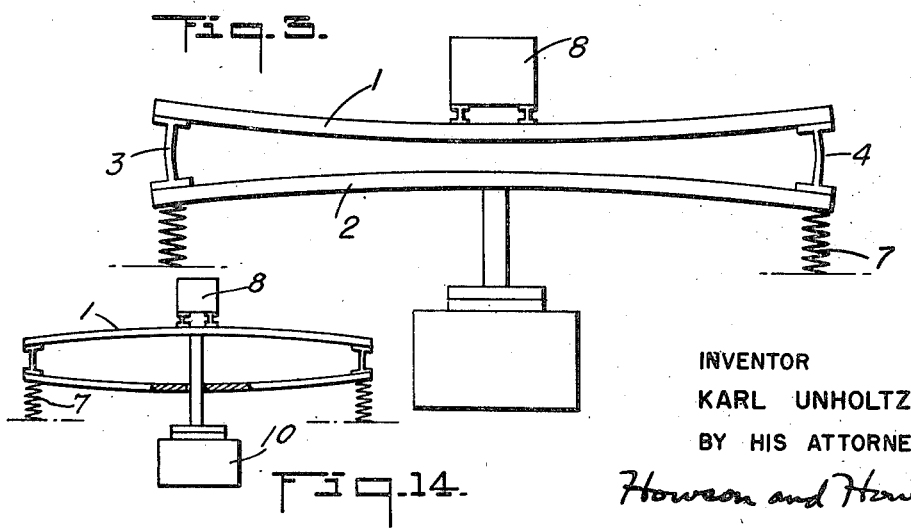
INVENTOR
KARL UNHOLTZ
BY HIS ATTORNEYS
Howson and Howson

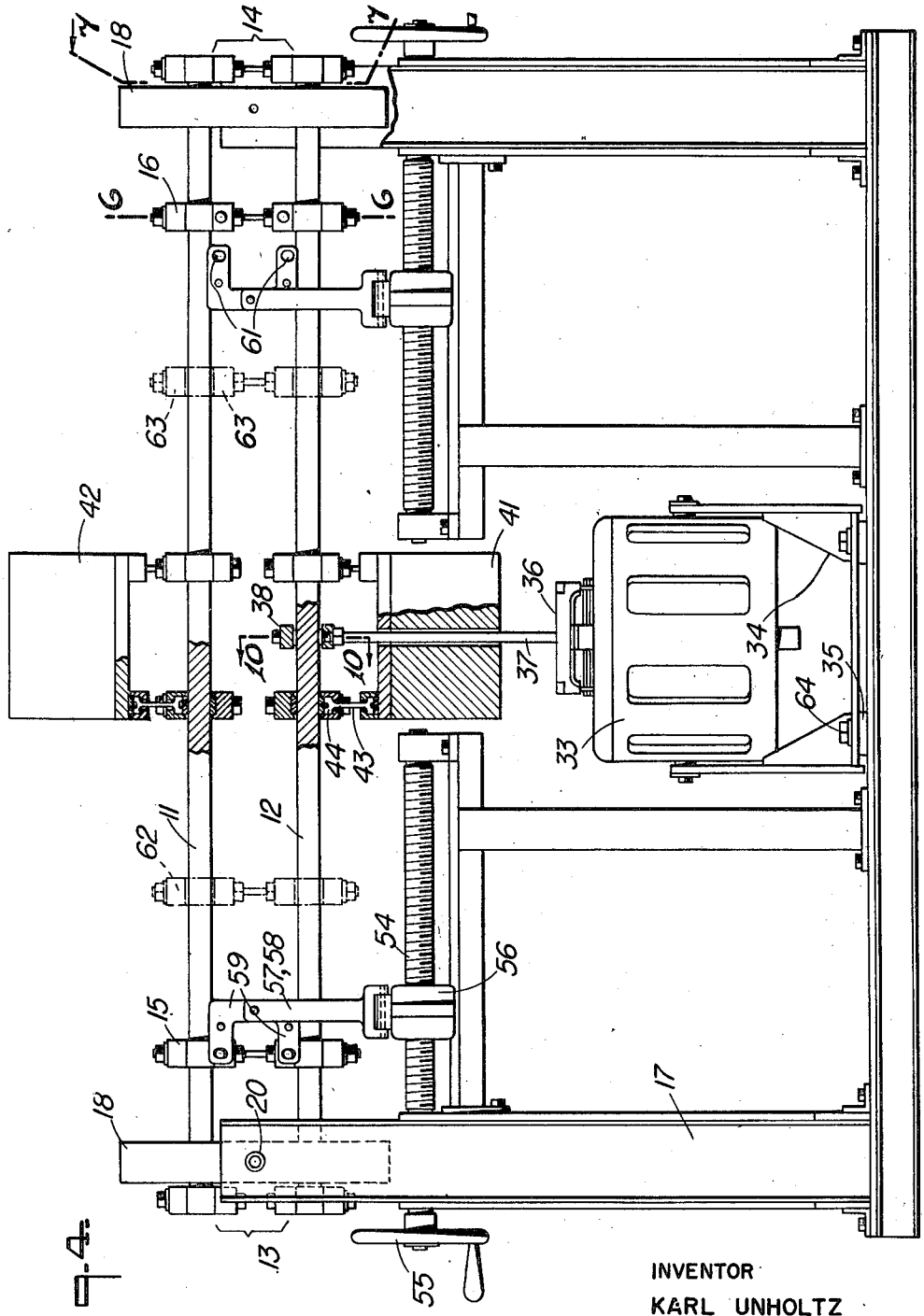

April 19, 1955 K. UNHOLTZ 2,706,400
VIBRATION GENERATING SYSTEM AND BEAM RESONATOR THEREFOR
Filed July 6, 1950 4 Sheets-Sheet 3
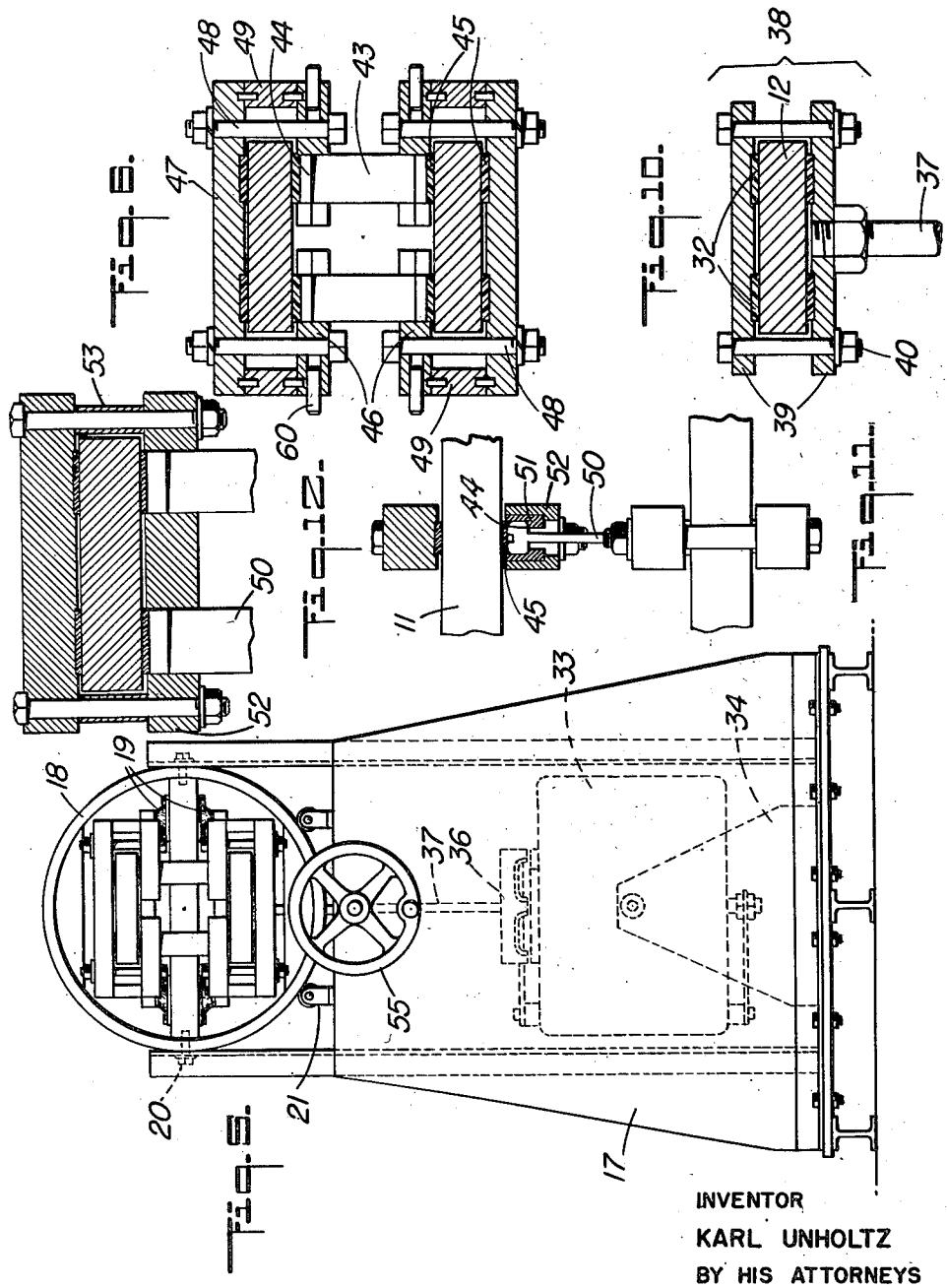
INVENTOR
KARL UNHOLTZ
BY HIS ATTORNEYS

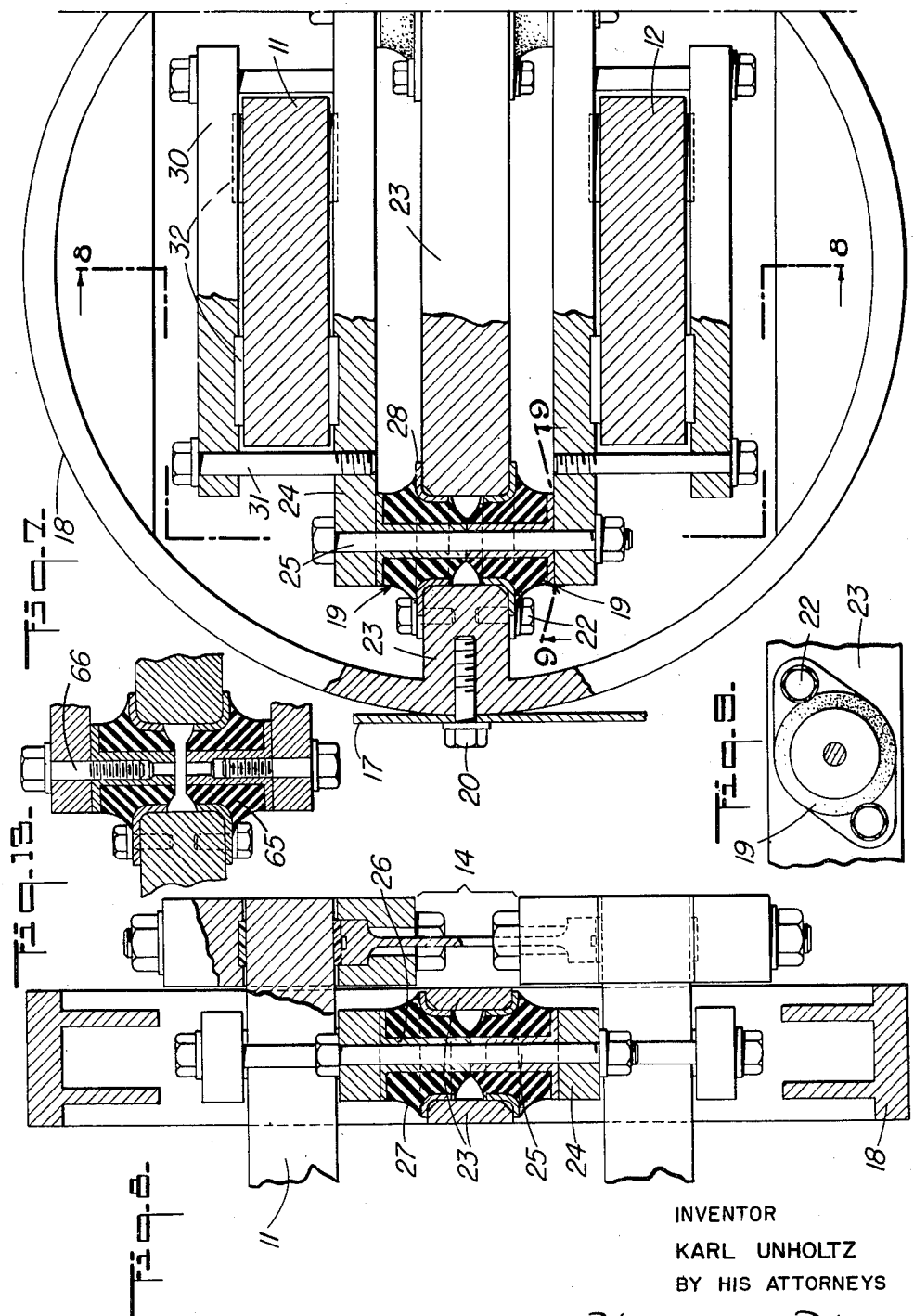

United States Patent Office 2,706,400
Patented Apr. 19, 1955

2,706,400

VIBRATION GENERATING SYSTEM AND BEAM RESONATOR THEREFOR

Karl Unholtz, Woodbridge, Conn., assignor to The MB Manufacturing Company, Inc., New Haven, Conn., a corporation of Connecticut Application July 6, 1950, Serial No. 172,334

10 Claims. (Cl. 73—67)

My invention relates to a vibration system for the generation of vibration and more particularly to a beam resonator for amplifying, i. e., for extending or magnifying, the level or severity of vibration attainable by the use of a given vibratory force generator acting on an object. Such systems can be used to test equipment or for many other industrial purposes. The force generator could be any of the many types known but, in particular, my invention finds application in connection with the electromagnetic (loud speaker) type generator which is widely used for the generation of vibration because of its flexibility in operation, wide frequency coverage, lack of rotating parts and lack of harmonics in the generated force. One disadvantage of the electromagnetic force generator, however, is the relatively large weight of the generator in relation to the peak value of generated force. Hence my invention is valuable in connection with the use of electromagnetic force generators to produce a vibratory motion of an object in amplification of that obtainable with the force generator by itself. In this manner, the need for very large sized force generators is minimized. It is characteristic of my invention that the system has a force generator attached to a beam resonator comprising a pair of beams which are arranged to behave as mechanically resonant force-amplifying members with all the major vibratory forces self-contained between the beams.

Vibration testing equipment is much used in modern industry, both to determine the strength of various structural and supporting members and to test malfunctioning of components under the influence of vibration. For purposes of these tests, vibration tables operating wholly upon mechanical principles have been known, as well as electromagnetic types of vibration exciters. The mechanical machines have usually not been able to produce frequencies higher than 60 cycles per second, although recently some have been known which operate as high as 100 cycles per second. It has been found, however, that there are frequencies above 100 cycles per second that sometimes cause material damage to the specimen being tested and that such weakness is not revealed at frequencies of 100 cycles and lower. It might also be pointed out that malfunctioning sometimes occurs at these frequencies above 100 cycles within very limited frequency bands because of the presence of mechanical resonance in the specimen itself. It has, therefore, become desirable to have equipment for testing above the frequency range normally attainable with purely mechanical types of vibration tables. The electromagnetic type of vibration exciters lend themselves to use in the higher frequency ranges as well as the lower frequency ranges, including several cycles per second to 10,000 C. P. S. and higher.

In general, the size and weight of an electromagnetic vibration force generator are greater than those of a corresponding purely mechanical exciter generating the same peak value of force. Therefore, in practice, while the electromagnetic type offers the possibility of high frequency testing, it has heretofore required that objects under test be limited in size compatible with the capacity of electromagnetic force generators available. For example, it is not unusual to require a vibration level of 20 times the gravity unit of acceleration on a test specimen weighing 200 pounds. The vibratory force required is 200×20=4000 pounds. It is therefore desirable to get force amplification from the magnetic vibration force generator in order to minimize the need for very large machines.

It is one object of my invention to substantially increase the vibratory forces available from vibration force generators by the use of mechanical resonance through a wide range of frequencies for vibration test purposes. Another object is to generate sinusoidal motion free from harmonic disturbances under conditions of large vibratory forces and high frequencies. I also want to provide essentially linear motion, free from rotation, of the vibration table for specimen mounting in order that the resulting vibration can be calibrated quantitatively. Another object is to provide such a system which can be easily adjusted for resonance through a wide range of frequencies, and to do all this by mechanism which can be easily adjusted to provide horizontal or vertical linear vibrational motion.

In the drawings:

Fig. 1 is a diagram of the essential elements of a vibration generating system built in accordance with my invention while the parts are in a state of rest;

Fig. 2 is a diagram of the parts of the vibration system of Fig. 1, showing the two beams while flexed apart;

Fig. 3 is a diagram similar to Figs. 1 and 2 but showing the two beams flexed toward each other;

Fig. 4 is a view in side elevation of a vibration generating system embodying the principles of my invention adapted to operate in the manner shown in Figs. 1, 2 and 3. This view shows a plurality of pairs of flexure members connecting the two beams; the connections between the beams and the test specimen, the counterweight and the electromagnetic force generator being shown partly in cross-section;

Fig. 5 is a view in end elevation of the system of Fig. 4;

Fig. 6 is a view in vertical section through a pair of flexure members tying the two beams of the generator of Fig. 4 together at a point intermediate the beam ends, the view being taken on the line 6—6 of Fig. 4;

Fig. 7 is a view in end elevation, partly in section, from the right of the machine of Fig. 4, showing the soft mounting of the beams; the view being taken on the line 7—7 of Fig. 4, looking in the direction of the arrow;

Fig. 8 is a view in elevation, partly in section, lengthwise of the machine, at right angles to the view of Fig. 7, showing the soft mounting of the beams and the pair of flexure members joining the ends of the beams; the view being taken on the line 8—8 of Fig. 7;

Fig. 9 is an inverted plan view showing the mounting plate for the vibration isolator between the lower beam and its mounting in Figs. 7 and 8; the view being taken on the line 9—9 of Fig. 7, looking in the direction of the arrows;

Fig. 10 is a vertical view in section through the lower beam, showing how it is connected to the electromagnetic vibration exciter or force generator; the view being taken on the line 10—10 of Fig. 4, looking in the direction of the arrows;

Fig. 11 is a view in elevation, similar to Fig. 6, of a modified form of flexure member;

Fig. 12 is a cross-section of the upper clamping bar of Fig. 11;

Fig. 13 is a view in elevation, taken lengthwise of the machine, of a modified form of the soft mounting of the beams; while Fig. 14 is a diagram similar to Fig. 2 in which the specimen is on the beam to which the generator is attached.

The mechanical part of my vibration system comprises a beam resonator having two flexible beams which are what I call "freely supported." A freely supported system is one that is supported by soft, resilient means which allows the system to vibrate without substantial influence from the supporting means, i. e., to vibrate as if it were freely floating in space. In this way, the supporting structure, by virtue of the soft, resilient means connecting it to the pair of beams, receives only the steady gravity loads and not the vibratory forces. Those vibratory forces are wholly contained between the two beams.

The two beams themselves are mechanically resonant and are held a fixed distance apart by means of flexure members which are made to be stiff in the direction of tension and compression loads directed normal to the adjacent faces of the beams. These flexure members offer relatively little resistance to the bending which results when the beams, at the points of attachment of the flexure members, assume a position not parallel to one another (see Figs. 2 and 3). The use of two flexure members, one at either end, and connecting the two beams together at points symmetrically displaced from the center, as shown in Fig. 1, gives essentially the equivalent of a hinged or pinned connection at each end. By this is meant that the spacing normal to the parallel beams is essentially fixed on the ends at the points of attachment of the flexure members, but the slope of one beam may change relatively to the other at this point. The natural vibration mode form at two extremes of motion is shown in Figs. 2 and 3, which illustrate the hinged action at the beam ends. This is the 180° out-of-phase mode of the two beams. The beams move together and apart alternately. This is the preferable mode in which the system is mainly operated, because this out-of-phase mode can be adjusted through a range of frequencies without changing the actual length of the beams. The frequency can also be changed by a simple adjustment of the weights attached. There is also possible an in-phase mode wherein the two beams vibrate as a unit, maintaining essentially fixed spacing throughout their length. The out-of-phase mode is easily recognized by persons skilled in the art by the use of vibration pickups and indicating or recording equipment. The in-phase mode does not lend itself to adjustment of frequency. This is also true of single beams. In the in-phase mode of operation of two beams the nodal point, contrary to the out-of-phase mode, shifts from the ends of the beams and larger motions result at the mounting points. By operating the two beams in the out-of-phase mode it is possible, by movement of the flexure members, to change the effective length of the beams and therefore the frequencies obtainable. This method of changing the frequencies has very much wider range than any previously known methods of changing the frequencies of resonant systems.

By employing two beams rather than one, the forces of one beam may be directed through the flexure members equally and oppositely to the forces of the other beam. This results in a nodal point in the center of the flexure member. By attaching the resilient supporting means to the beams close to, i. e., at or near, the flexure member attachment of the beams, exceedingly small vibrational forces are transmitted to the supporting structure. This is so because the points of attachmen of the resilient means to the vibrating beams, being located at or near nodal points of the pair of beams, experience a minimum of vibratory motion. The flexibility of the freely supporting means therefore has very little vibration to cushion.

By resonator, with its two beams, has the further advantage that a nodal point fixed in space or at the hinged end is enforced on the beams by the application of equal and opposite forces instead of by the use of an exceedingly stiff supporting structure. This factor is extremely important, particularly when high frequencies are involved, because it is exceedingly difficult, if not impossible, to construct pedestals or supports which are sufficiently rigid to impose a nodal point in a vibrating system designed for vibrating large masses at high frequencies. On the other hand, the enforcement of nodal points in the vibrating system is necessary to control frequency, and the ability to do so in general marks the success with which a wide frequency adjustment can be obtained. This will be understood more clearly from the following description.

I have found that the frequency of mechanical resonance can be varied through wide limits on my pair of beams by employing the hinged end condition through the use of one flexure member at each end for low frequencies and a multiplicity of pairs of flexure members between the beams, symmetrically displaced from the center towards the beam ends, for high frequencies. Frequency adjustment intermediate between high and low frequency may be accomplished by varying the placement of the flexure members. The closer the flexure members are placed towards the center of the beams, the shorter the active length of the beams with a resulting increase in frequency.

I have found that a single flexure member at each end of the pair of beams gave the end condition referred to as "hinged," but if a second flexure member were added at each end, a new end condition on the beams resulted, namely, "clamped." By this I mean that the two beams were not only fixed in their relative spacing on the ends due to the stiffness of the flexure members at the ends, but the beams were restrained to remain parallel to each other at the ends. Between the center or second pair of flexure members the beams can still flex. My form of "hinged" plus "clamped" configuration by the addition of flexure members was found to give a greater range of frequency adjustments for a given beam section and length than was possible using only a "clamped" end condition. Furthermore, I have found, practically speaking, that a gradual frequency change was obtainable by first using a single flexure member at each end, then adding a second very close to the first, and then gradually separating the flexure members. It was found that a range of frequencies of 25 to 1 could be obtained using two steel beams approximately 2" thick, 8" wide and 7' long, with a concentrated weight of 250 pounds in the center. If the length of the beams were increased appreciably, a wider frequency range could be obtained with accelerations up to 20 g and higher. Stresses in all parts were found to be well within the endurance limit of the steel, assuring freedom from failure of the metal parts, with continued service.

It was found desirable to make provisions for adding a balancing weight on one beam to counteract the weight of the test item mounted on the second beam. By so doing, the amplitude of both beams could be made equal in the resonant mode. At times it may be desirable to operate without the balance weight, although it is recognized that this means unequal amplitude on the two beams. Control of the amplitude of one beam relative to the other, which in general is equal until a sizable mass is attached to one in the form of a test specimen, is desirable in order to limit the amplitude of the beam to which the force generator is attached. Control of the amplitude gives a means for adjusting the impedance of the system as related to the force generator. This makes adjustment possible for the maximum transfer of power from the force generator to the beam system.

In general, the force generator can be attached to either beam (see Figs. 2 and 14). However, in practice it is convenient to attach the force generator to one beam and reserve the other for the attachment of the test article unencumbered by the force generator attachment.

Having thus outlined some of the broad principles underlying my invention, I will next describe the diagrammatic embodiments shown in Figs. 1, 2 and 3 of the drawings.

As can be seen in the diagrams constituting Figs. 1, 2 and 3, I provide an upper beam 1 and a lower beam 2 spaced from each other by flexure members 3. In these three figures, the flexure members 3 and 4, shown in solid lines, are at the ends of the beams. These flexure members are stiff vertically, i. e., in their spacing of the beams apart, so that they resist both tension and compression in those directions. However, they are able to flex, so that, as can be seen in Fig. 3, when the beams 1 and 2 bend, the flexure members maintain contact with them by themselves bending intermediate their ends. In Fig. 1 I have shown an additional flexure member 5 spaced to the right a short distance from the left end, and a flexure member 6 spaced some distance inward from the right-hand ends of the two beams. With flexure members 3 and 5 at the left end, and 4 and 6 at the right end, there is a clamped-clamped condition, while with only the single flexure member 3 at the left end and single flexure member 4 at the right end, there is the equivalent of the hinged-hinged condition.

Underneath the left and right ends of the lower beam 2, I have shown springs 7 to represent the soft mounting to the ground. By these means the beams are supported on springs of sufficient flexibility so that the influence of the dynamic forces from the springs can be neglected in the overall system. Actually, there is substantially no loss of energy or disturbance of the system by outside influences with the form of mounting that I employ. 1 have shown in these three figures a square to represent the test specimen 8 mounted on the middle of the upper beam. It, too, is carried by flexure members 9 between the specimen and the upper beam so as to have the movements of the upper beam transmitted to the test specimen without disturbance due to the bending of the upper beam. As I will hereinafter explain, the test specimen might be located on the lower beam, but I find it convenient in most cases to put it on the upper beam. My electromagnetic vibration generator or shaker 10, I have shown attached to the middle of the lower beam 2.

Turning now to an actual embodiment, I draw attention to Figs. 4 to 10, inclusive. In the side elevation of Fig. 4 there are the upper beam 11, lower beam 12, left end flexure member 13, right end flexure member 14, extra or left end clamping flexure member 15 and extra or right end clamping flexure member 16. The two beams are supported near their ends at each end of the frame 17 of the machine by an end ring support 18 attached to the frame and to vibration isolators 19 between the ring support 18 and the beams. The details of these supports are shown in Figs. 5, 7, 8 and 9. The end ring supports are arranged in a vertical plane and are bolted, front and back, to the frame of the machine by ring locking screws 20. Near the bottom, each ring rests on ring support rollers 21. By withdrawing the ring locking screws temporarily, the end ring supports can be rotated on the rollers to turn the beams from the horizontal position shown to vertical position, if it is desired to test at that other angle. The screws would then be reinserted in the rings at the new position.

If it is desired to arrange the beams 11 and 12 in a vertical plane so that their vibrations are horizontal, the ring-locking screws 20 are removed and the ring supports 18 rotated to 90°. The electromagnetic force generator 33 can be moved up simultaneously with the ring by removal of the bolts 64 which hold the electromagnetic shaker to the frame. Any desired form of support for the electromagnetic force generator in this horizontal position can be provided.

It will be noted that when the generator is in its horizontal position the vibration table 36 will be lying in a vertical plane.

Forming part of each ring support is a bar 23 extending across the diameter of the ring. When the beams 11 and 12 are in horizontal position, the ring-locking screws 20 take into the ends of the bar 23, but the essential function of the bar is to support the vibration isolators 19 which are fastened between the ring, on the one hand, and the beams, on the other. There are two isolator clamping bars 24 extending across the inside of the ring support 18, and two of the vibration isolators 19 are held between those bars in a hole adjacent each end of the bar 23 by bolts 25. These vibration isolators are of a balanced compression type having a central tube and end plate rigid member 26 on one side of the rubber 27. The bolts 25 pass through this central tube and each end of each bolt holds one of the clamping bars 24 to this rigid central member. This member may be considered as the supported member. Outside the rubber, at a point midway of the end of the isolator, is a plate 28 engaged in and bonded to the rubber, which may be considered as the supporting member of the isolator. This supporting member is fastened to the support bar 23 on the ring support 18 by bolts 22. Each pair of isolators 19 bolted to the support bar 23 provides the isolation at one end of each of the two clamping bars 24 for the two beams 11, 12. The two isolators are faced oppositely to each other but are arranged axially on the same bolt in this particular embodiment, and the central supported member 26 of each isolator contacts the supported member of the other isolator. The two isloators at each end can also be fastened with separate bolts and out of contact with each other, if desired. This form of attachment allows the beams to move relative to one another through the flexible isolators, as well as relative to the supporting ring. This form of construction is shown in Fig. 13, in which it will be seen that the two isolators 65 have a short space between them so that they are not in contact with each other. In addition it will be noted that each isolator has a separate screw bolt 66 screwed into the center of the isolator, the two bolts being out of contact with each other. This is the preferred form of mounting the isolators. As can be seen from the inverted plan view of Fig. 9, the bolts connecting the outer supporting member of the isolators to the support bar 23 are offset from the center line of the ring support 18.

The beams 11, 12 are located outside the isolator clamping bars 24, namely, the upper beam rests on the upper side of the top clamping bar and the lower beam on the lower side of the lower clamping bar. They are held in these positions by outer isolator clamp bars 30 bolted to the longer clamping bars 24 beside the longitudinal edges of the beam by bolts 31. Spacers 32 can be provided above and below each beam between it and the outer clamps 30 and clamping bars 24, as shown in the drawings. The material of the spacer is selected to minimize surface chafing or galling between the stressed beam on the one hand and the unstressed clamp on the other hand. I have found that a phenolic material is satisfactory for the spacer.

This completes the description of the support of the resonant beam to the ground, i. e., to the frame of the machine.

I will now describe the connection between the electromagnetic vibration generator or shaker and the lower resonant beam 12. The shaker 33 is mounted on a base 34 which is fastened to the frame 17 of the machine by bolts 64 in connection with rubber pads 35 so as to provide vibration isolation between the shaker and the frame of the machine. The bolt 64 can be left loose to allow flexible action of the pad 35 in order to isolate vibratory forces generated in the force generator from the supports, or the bolt 64 may be tightened, giving a rigid connection between the force generator and the supports which may be desirable in certain low frequency operations. The shaker has the usual table 36 on top of it, to which is fastened a force-transmitting link 37. This vertical link takes into a link-to-beam clamp 38 which encircles the lower resonant beam 12. The details of this link-to-beam clamp are shown in cross-section in Fig. 10. It will be seen that this is somewhat similar to the manner in which the beams are held in the vertical planes of the ring 18 between the isolator clamping bars 24 and the outer clamps 30. The clamp comprises two horizontal bars 39 of equal length, one extending across the top of the beam and the other across the bottom, the two bars being bolted together by bolts 40 and there being the usual spacer 32 between the bars and the beams. The force-transmitting link 37 screws into the lower bar 39.

I will now describe the flexure members 13, 14, 15 and 16 shown in Fig. 4. As can be seen from this figure, the form of flexure members joining the two beams is substantially the same as the form of flexure members suspending the counterweight 41 on the lower beam 12. The same form of flexure members is used to suspend the test specimen 42 on the upper beam 11. While in Fig. 4 the flexure members which I have chosen to show in section are the ones carrying the counterweight 41 and the test specimen 42, Fig. 6 shows a flexure member between two beams in section taken across the beams. It will be seen that there are two flexure members 43 extending between the two beams. These flexure members do not extend through the beams but are held by their shoulders 44 in clamping means which encircle the beams. Between each shoulder and a beam is a phenolic spacer 45. The clamping means comprise an inner clamp 46 in which the shoulder of the flexure member is held, an outer clamp 47 extending across the top of the beam and vertically extending bolts 48 joining the inner and outer clamping members. These bolts pass just outside of the edges of the beams and are opposed by compression members 49 extending between the ends of the inner and outer clamps outside the bolts. The inner clamps 46 are cut away opposite the shoulders of the flexure members to support those members. Each inner clamp is in two pieces, spaced apart to facilitate assembly of the flexure members and clamping means. As shown, each part is held by one bolt and in turn supports one flexure member. The outer clamp is a double member extending all across the top of the beam. It will be seen that a form of flexure member described and mounted in this way will have the properties above mentioned of being stiff and maintaining the spacing of the two beams but permitting them to bend between the points of attachment of the flexure members by bending of the flexure members at their thin central parts.

In Figs. 11 and 12 I have shown a preferred form of flexure member which is stiffer and more easily assembled than the form just described. The flexure member 50 itself is substantially the same as the flexure member of Figs. 4 and 6, although its dimensions are slightly different. This inner clamp is one continuous piece, as shown in Fig. 12, and is stiffer than the corresponding clamp in Figs. 4 and 6. For ease in assembly, I use a shouldered insert 51 between the flexure member itself and the flexure inner clamp 52. The opening in the bottom of the inner clamp is wider than in the forms of Figs. 4 and 6, but the opening in the bottom of the insert is substantially the same as the opening in the bottom of the inner clamp in the embodiment of Figs. 4 and 6. The same phenolic spacer 45 can be used as in the previous embodiment. In the embodiment of Fig. 12, I have shown sleeves 53 of phenolic material placed over the bolts 48 in order to fix the spacing of the clamps and bolts relative to the beam without metal-to-metal contact between the bolt and the beam. Such sleeves can also be used in the embodiment of Fig. 6, if desired. In the embodiment of Fig. 12, the compression members 49 are omitted.

As indicated in the description given previously, when a "clamped" condition is desired, there must be at least two flexure members near each end of the beams, symmetrically arranged. The position of the center pair of flexure members must be adjusted in order to give the desired vibrational frequency, and any desired means can be employed to obtain this correct positioning. Merely to illustrate the thought that mechanism can be used to obtain the correct positioning of a second or third pair of flexure members, I have shown such mechanism in Figs. 4 and 5 and will now describe it. Mounted in the frame 17 of the machine near each end is a horizontal threaded screw 54 adapted to be rotated by a hand wheel 55. Travelling on each screw is a sleeve 56 carrying a pair of arms 57, 58 pivoted thereon. Each arm, when vertical, extends upwardly to a position opposite the flexure members. Each arm has two lugs 59 extending laterally in the same direction from the upright portion of the arm, each lug lying opposite the inner clamp 46. The lower lug lies opposite the inner clamp at the lower end of the flexure member, i. e., for the lower beam, and the upper lug opposite the inner clamp for the upper beam. As can be seen in Fig. 6, there is a pin 60 projecting laterally from the end of the inner clamp on each side, and each pin is adapted to fit into a hole 61 in the end of the corresponding lug of the arm. When it is desired to move a flexure member, the pressure of the clamps on the flexure member is first released by loosening the nut on bolt 48. It is then possible, by turning the hand wheel, to cause the sleeve to bring the arms opposite the flexure member to be moved. A similar procedure, of course, is carried out at the other end of the frame of the machine. When a sleeve is opposite the flexure member to which it is to be connected, the front and back arms 57, 58 on the sleeve are then swung upwardly on opposite sides of the beams and the openings engaged on the pins on the inner clamps. By rotation of the hand wheel 55 the flexure member can then be moved to the desired position. When this has been done the arms are swung outwardly, disengaging the openings from the pins, and the flexure member is in condition to operate in its new location. It will be obvious that many other devices or separate tools could be used to move the flexure members to any desired position. It will also be obvious that the mechanism which I have shown can be used successively to move a number of different flexure members if more than two flexure members are being used at each end. Thus in this figure I have shown the inner or clamping pair of flexure members 15, 16 in solid lines, with the arms of the adjusting means on one side of the figure engaging the pins and on the other side disengaged therefrom, and the adjusting means moved away from it; but in addition I have shown dotted an additional flexure member 62, 63 at each end near the center but symmetrically arranged to suggest that three flexure members can be used or that the second pair 15, 16 can be moved to another location.

The range of frequencies obtainable can be changed by changing the beams 11, 12 to ones of another thickness. Longer beams also give frequencies additional to those of the shorter beams.

It will be seen that my invention substantially increases the vibratory forces available from a given vibration force generator and that it is possible to vibrate test specimens weighing 200 pounds or more at 20 times the gravity unit of acceleration or more through a frequency range from several cycles per second to more than 500 cycles per second. It will also be seen that my system generates sinusoidal motion free from harmonic disturbances although the vibratory forces are large and the frequencies high. My system also provides essentially linear motion free from rotation of the vibration table for specimen mounting, with the result that the vibration can be calibrated quantitatively. The machine has a minimum of internal damping which allows maximum magnification of the vibration force. It can be easily adjusted for resonance through a wide range of frequencies. It can also be adjusted to provide either horizontal or vertical linear vibrational motion, as above mentioned.

What I claim is:

1. A beam resonator for a vibration generating system comprising a pair of mechanically resonant, generally parallel beams, resilient means supporting the parallel beams which allow the beams to vibrate substantially freely, and flexure members forming interconnections of rigid length between the beams and having the ability to bend with the beams while holding them a fixed distance apart at spaced points generally located symmetrically about the longitudinal centers of the beams and adapted to transmit forces therebetween; the supporting means being attached to the beams close to the flexure members, whereby a vibratory force applied to one beam intermediate the spaced points is amplified and only small vibratory forces are transmitted to the supporting means.

2. A beam resonator for a vibration generating system comprising a pair of parallel resonant beams, and soft, resilient means supporting the beams at or near nodal points, in combination with a plurality of flexure members holding the beams a fixed distance apart at spaced points symmetrically located about the longitudinal center of the beams, the flexure members also being adapted to permit the beams to assume non-parallel positions relatively to each other between spaced points when the beams are vibrating in an out-of-phase mode; whereby a vibratory force applied to one beam intermediate the spaced points is amplified.

3. A beam resonator for a vibration generating system comprising a pair of mechanically resonant, generally parallel beams, soft, resilient means supporting the beams at or near their end nodal points substantially free of vibratory forces, and flexure members forming interconnections of rigid length between the beams and having the ability to bend with the beams when the latter are moving in their out-of-phase mode while holding them a fixed distance apart at spaced points generally located symmetrically about the longitudinal centers of the beams and adapted to transmit forces therebetween; whereby a vibratory force applied to one beam intermediate the spaced points is amplified.

4. A beam resonator for a vibration generating system according to claim 3 in which there is at least one flexure member symmetrically displaced at only one point from the center toward each end of the beams, each flexure member being stiff in the direction of tension and compression loads directed normal to the adjacent faces of the beams but the flexure members being relatively flexible to bending thereby permitting the beams, at the points of attachment of the flexure members, to assume positions not parallel to one another; whereby a hinged connection is created between the beams at a flexure member on each side of these centers and the beams will amplify any vibratory force applied to one beam intermediate the flexure members.

5. A beam resonator for a vibration generating system comprising a pair of parallel resonant beams, and a plurality of flexure members located at points symmetrically spaced about the longitudinal centers of the beams and holding the beams a fixed distance apart, each flexure member being stiff in the direction of tension and compression loads directed normal to the adjacent faces of the beams, but the flexure members being relatively flexible to bending when the beams, at the points of attachment of the flexure members, assume positions not parallel to one another, in combination with means supporting the beams substantially free of vibrational forces at points close to the flexure members and to the end nodal points of the beams; whereby vibrational forces applied to one beam intermediate the spaced points are efficiently amplified.

6. A beam resonator for a vibration generating system comprising a pair of parallel resonant beams and soft, resilient means supporting the beams at or near nodal points, which means allow the beams to vibrate substantially without influence from them, in combination with a plurality of end flexure members holding the beams a fixed distance apart at spaced points symmetrically located, the flexure members also being adapted to permit the beams to assume non-parallel positions relatively to each other when operating in the out-of-phase mode, there being extra movable clamping members joining the beams and located symmetrically between the end flexure members and adapted to permit their positions to be changed lengthwise of the beams; whereby the frequency of the mechanical resonance of the beams can be adjusted and a vibratory force applied to one beam intermediate the spaced points is amplified.

7. A beam resonator according to claim 6 in which there are at least two flexure members at separate points longitudinally of the beams near each end of the pair of beams interconnecting same; whereby a clamped condition exists at the ends of the beams and higher frequencies are obtainable than in the hinged condition existing when there is only one flexure member near each end.

8. A beam resonator for a vibration generating system according to claim 1 in which there are at least two flexure members at separate points longitudinally of the beams near each end of the pair of beams; whereby a clamped condition exists at the ends of the beams and the effective length of the beams is changed.

9. A beam resonator for a vibration generating system comprising a pair of parallel resonant beams, and soft, resilient means supporting the beams substantially free of vibratory forces and a plurality of flexure members holding the beams a fixed distance apart at points symmetrically spaced, the flexure members also being adapted to permit the beams to assume non-parallel positions relatively to each other, in combination with a balancing weight attached to the middle of one beam and means on the other beam to attach a test specimen; whereby the relative amplitude of vibration of the two beams can be adjusted.

10. A beam resonator for a vibration generating system comprising a pair of mechanically resonant, generally parallel beams, soft, resilient means supporting the beams at or near nodal points, which means allow the beams to vibrate substantially without influence from the supporting means, and flexure members forming interconnections of rigid length between the beams and having the ability to bend with the beams while holding them a fixed distance apart at spaced points generally located symmetrically about the longitudinal centers of the beams and adapted to transmit forces therebetween, in combination with extra movable clamping means intermediate the flexure members also adapted to hold the beams a fixed distance apart and to flex with the beams, said extra clamping means being adapted to permit their positions to be changed lengthwise of the beams; whereby a vibratory force applied to one beam intermediate the spaced points is amplified and the frequency of the mechanical resonance of the beams can be adjusted.

References Cited in the file of this patent

UNITED STATES PATENTS

| Number | Name | Date |
|---|---|---|
| 216,352 | Sanderson | June 10, 1879 |
| 828,357 | Waugh | Aug. 14, 1906 |
| 892,041 | Fletcher et al. | June 30, 1908 |
| 1,153,058 | Gilfillan | Sept. 7, 1915 |
| 1,227,307 | Plank | May 22, 1917 |
| 1,563,531 | Schieferstein | Dec. 1, 1925 |
| 1,720,574 | Schieferstein | July 9, 1929 |
| 1,880,425 | Flanders | Oct. 4, 1932 |
| 2,331,779 | Hjarpe et al. | Oct. 12, 1943 |
| 2,336,930 | Dyer | Dec. 14, 1943 |
| 2,349,839 | Apicella | May 30, 1944 |
| 2,481,131 | Lindsay | Sept. 6, 1949 |

FOREIGN PATENTS

| | | |
|---|---|---|
| 25,024 | Great Britain | 1899 |